2,895,849
METHOD OF PREPARING COATED REFRACTORY WARE

Morris L. Perlman, Blue Point, N.Y., and David Lipkin and Sam I. Weissman, St. Louis, Mo., assignors to the United States of America as represented by the United States Atomic Energy Commission No Drawing. Application April 12, 1950
Serial No. 155,566

1 Claim. (Cl. 117—62)

This invention relates to refractory ware and more particularly to methods for preparing refractory ware adapted to the handling of radioactive materials.

In metallurgical operations using fissionable and source materials, the metals may be melted and cast in a refractory crucible to form a pellet or button. Such a crucible must, of necessity, be fabricated of a material which is inert to or non-reactive with these radioactive metals at elevated temperatures. Also, it is essential that the refractory ware be very dense and/or impervious to the molten radioactive materials in order to minimize losses of such materials by absorption into the crucible.

Another difficulty encountered in handling certain molten materials is that of "creeping" of the molten material from its refractory container. This is characteristic of certain metals exposed to high temperatures in the standard tantalum crucibles used for mass spectrometer studies and is caused primarily by the wetting action of the molten materials on the tantalum crucible. The loss of the molten sample is seen to be not only a costly waste but a health hazard to personnel.

Refractory ware available prior to the time of this invention was found to be deficient in the aforementioned characteristics with respect to the handling of the dense radioactive metals and other materials subjected to very high temperatures.

It is, therefore, a primary object of the present invention to provide a method of preparing refractory ware which is suitable for the handling of dense radioactive metals at elevated temperatures.

It is another object of this invention to provide a method for preparing dense, impervious refractory ware which is resistant to creeping of molten radioactive metals.

It is another object to provide a simple method for coating refractory ware with a layer of impervious material which is non-reactive in contact with dense radioactive materials.

The objects of the present invention are achieved by a process of preparing refractory ware which comprises coating a heat stable refractory form with a metal and then exposing it to a reactive atmosphere under such conditions of temperature and pressure as to convert the metal to a refractory compound of the metal.

The term "heat stable form," as used herein, is intended to mean any suitable refractory material having a melting point in excess of about 2000° C. Examples of such forms are high melting point metals and alloys and metal-containing ceramic compositions.

Metals suitable for coating the heat stable form comprise uranium and metals of the fourth periodic group having melting points of at least 600° C. Particularly suited to the method are the transition heavy metals of the IV–B periodic group such as titanium, zirconium, cerium and thorium, and/or mixtures of such metals. Said coating metals may be applied as a thin film to the heat stable form by any convenient method such as melting, sputtering, plating or the like, and, when so applied, are reacted with a second component to form the desired non-reactive film. The second component, generally reacted at a substantially elevated temperature, but below the melting temperature of the coating metal, may comprise a gaseous material such as nitrogen, sulfur, methane, boron hydrides, or mixtures thereof, or a material which, on heating, will yield reactive nitrogen, sulfur, carbon, boron, or mixtures thereof. The gas reacts with the coating metal to form the appropriate nitride, sulfide, carbide or boride of the metal and gives a smooth, impervious layer on the shaped form which resists creeping of molten materials. The coated form then may be heated to an elevated temperature under reduced pressure to degas the mass and consolidate the coating.

In order to illustrate clearly the method of operation of the invention, the following examples are given for that purpose and not for the purpose of limiting the scope of the invention. In the first example, the refractory ware to be treated is tantalum and the impervious coating placed thereon is thorium nitride.

Example I

A tantalum crucible is coated uniformly with a 3-mil layer of thorium by electroplating techniques well known to one skilled in the art. The metal coated crucible is placed in a vacuum furnace in an atmosphere of nitrogen and heated to a temperature of 1700° C. for about 30 minutes. The pressure within the vacuum furnace then is reduced to a value of about $10^{-5}$ millimeter of mercury which assures that all the unreacted nitrogen will be removed and the newly-formed thorium nitride coating will be degassed. Also, at pressures of about $10^{-5}$ millimeter of mercury any tantalum nitride which may have formed will be dissociated; thorium nitride does not dissociate at this pressure. A high density, non-porous, evenly-coated crucible of precise dimensions is obtained by this method.

It should be pointed out that the metal coating step described in the following examples is performed as rapidly as possible to avoid alloying of the coating metal with the refractory metal article at the elevated temperature employed. With induction-type heating means of appropriate capacity, the coating step, including the melting and deposition of the metal, may be accomplished in from one-half minute to 10 minutes. Preferably, the coating time is of the order of about 5 minutes, which is adequate to insure deposition of the metal with substantially no undesirable alloying.

Example II shows another embodiment of the invention wherein a zirconium nitride coating may be applied to tantalum ware.

Example II

A tantalum dish is heated at about 2200° C. under a vacuum of about $10^{-5}$ millimeter of mercury for one hour to remove volatile impurities. The dish is cooled under vacuum and any solid impurities which may have cooked out are removed with a platinum spatula. About 0.5 gram of zirconium metal pellets are placed in the dish which is then heated rapidly to a temperature of about 1900° C. at a pressure of about $10^{-4}$ millimeter of mercury. In about 10 minutes a substantial amount of the zirconium metal melts and deposits on the inner surface of the tantalum dish in a smooth uniform layer about 3 mils thick. A small amount of zirconium may be deposited on the outer edge of the rim of the dish but this is not detrimental to the process. The zirconium-coated tantalum dish is placed in a chamber containing purified nitrogen maintained at a pressure of about 70 millimeters of mercury. The temperature of the chamber is raised to 1750° C. and held there for one hour during which time the zirconium reacts with the nitrogen to form a 3- to 5-mil thick layer of zirconium nitride on the tantalum dish. This nitride layer is velvety smooth, uniform, and impervious to molten radioactive metals and other molten heavy metals. Further, the wetting by molten metals of a crucible coated with zirconium nitride by the method of the invention is substantially eliminated and consequently the loss of the material through creeping is correspondingly reduced.

While the foregoing examples have set forth two embodiments of the invention, other embodiments of equal value are possible. For example, refractories comprising metals other than tantalum may be coated by the method of the present invention provided due consideration and adjustment is made for the difference in melting points of such suitable metals as thorium, tungsten, molybdenum, niobium, and the like.

In the following example tungsten is coated with a layer of thorium nitride by the method of the present invention.

Example III

A shaped tungsten refractory such as a dish is heated in vacuo about one hour at 2200° C. to remove impurities. A few tenths of a gram of thorium metal are melted in the degassed refractory at a temperature of about 1950° C. and at a pressure of about $10^{-4}$ millimeter of mercury. In about 5 minutes a smooth, thin, shiny layer of the material deposits on the interior surface of the refractory shape. The thorium coated refractory dish is placed on a tantalum stand which has previously been heated at 2200° C. The refractory and stand are then placed in a quartz furnace tube from which air has been evacuated and replaced with purified nitrogen at a pressure of about 80 millimeters of mercury. The furnace is heated by induction to 1750° C. in about 10 minutes and held there for 30 minutes while the nitrogen pressure is maintained between 60 and 80 millimeters of mercury. Heating is stopped and the nitrogen is pumped out to a pressure of about $10^{-4}$ millimeter of mercury in 5 minutes. Heating is resumed and the pressure is maintained at about $10^{-4}$ millimeter of mercury for one-half hour. The final temperature is about 1725° C. The heat is turned off and the furnace permitted to cool to about 200° C. before the coated refractory is removed. The nitrogen has reacted with the thorium coating to form a smooth, velvety coating of thorium nitride suitable for melting high density radioactive metals without the disadvantages accompanying the melting in standard tantalum, or tungsten refractories. Creeping and sticking of molten radioactive metals is essentially eliminated by the use of refractory ware coated by the method of the present invention.

As another embodiment of the present invention there is set forth in the following example a disclosure of a method of affixing a coating of cerium sulfide to a tantalum crucible.

Example IV

Into a small tantalum crucible, which has been cooked out at 2200° C. for an hour at a pressure of about $10^{-3}$ millimeter of mercury, is placed 0.2 gram of chemically pure cerium metal powder. The crucible and contents are placed in a quartz furnace, the air is evacuated therefrom and argon is admitted to a pressure of about 50 millimeters. The crucible is heated rapidly to a temperature of about 950° C., then slowly to 1100° C. The vacuum is applied to the furnace and the temperature is increased in 10 minutes to a value of about 1700° C. At this temperature a minimum pressure of about $10^{-5}$ millimeter of mercury obtains. The heat is turned off and the furnace is permitted to cool to about 450° C. under vacuum. The crucible is found to contain a smooth, bright coating of cerium metal about 5 mils thick. A few grams of sulfur are vaporized in an adjacent chamber and enough of the volatile gas is introduced into the quartz furnace to increase the pressure to about 50 millimeters of mercury. In about 20 minutes the sulfur deposits on the cooled cerium-coated crucible to a thickness of from 2 to 5 mils depending on the amount of sulfur vapor introduced. Argon is admitted into the furnace to minimize evaporation of the sulfur from the crucible, the system is sealed, heated to about 800° C. for 5 minutes and evacuated. The excess sulfur is volatilized leaving on the crucible a firm, velvety, cerium sulfide layer approximately 3 mils thick.

It is, of course, possible to supply reactive sulfur for the sulfiding step in a form other than vaporized sulfur atoms. For example, hydrogen sulfide or other gaseous sulfides may be introduced into the reaction furnace at temperatures above which substantial dissociation of the gas occurs. In an embodiment employing hydrogen sulfide, the gas may be introduced at a temperature of about 625° C. At this temperature the cerium reacts readily with the reactive sulfur which is present as a result of the dissociation of the hydrogen sulfide.

Still another embodiment of the invention is set forth in the following example which relates to the coating of tantalum with an impervious, creep-resisting film of titanium carbide.

Example V

Into a small tantalum crucible previously degassed in a vacuum at 2200° C. is placed about 0.1 gram of titanium metal powder. The crucible is heated at about 2000° C. in a vacuum furnace at a pressure of $10^{-4}$ millimeter of mercury to liquefy the titanium and to cause the molten metal to be deposited over the inner surface of the tantalum crucible. In about 2 minutes, under these conditions, essentially all of the molten titanium is deposited on the inner surface of the crucible in a thin uniform layer. The furnace is cooled to about 500° C. and pure methane is admitted into it at a pressure of about 28 millimeters of mercury. The furnace is then heated to 1700° C. in 10 minutes while reducing the pressure to a value of about $10^{-4}$ millimeter. The methane dissociates under these conditions and a smooth, gray layer of titanium carbide forms on the inner titanium-coated surface of the crucible by the reaction of the titanium with carbon from the dissociated methane.

While the above examples have set forth preferred embodiments of the invention with respect to certain coating metals, namely, cerium, titanium, thorium and zirconium, it is possible to use other related and workable metals. As set forth in the following example, uranium may be nitrided on a refractory wolfram crucible.

Example VI

A shaped tungsten article, such as a small 1-inch diameter crucible, is degassed by heating it in a vacuum furnace at 2500° C. at a pressure of about $10^{-4}$ millimeter of mercury for at least 10 minutes. When cool, the vacuum is broken by admitting argon at atmospheric pressure. Into the crucible, under this protective atmosphere, is placed about 0.3 gram of coarse uranium metal powder. The system is closed, evacuated to a pressure of about $10^{-4}$ millimeter of mercury and heated to a temperature of about 1800° C. for about 5 minutes. Under these conditions of temperature and pressure the uranium powder melts and a thin film of the metal is deposited on the surfaces of the tungsten crucible. The temperature of the crucible is permitted to cool to about 650° C. and purified nitrogen gas is introduced into the furnace to a pressure of about 70 millimeters of mercury. Heating is resumed and the temperature is raised to about 1000° C. and held there for about 15 minutes while the pressure in the furnace is reduced to about $10^{-3}$ millimeter of mercury. The nitrogen reacts with the uranium film to form a tough, impervious uranium nitride coating from 1 to 3 mils thick on the surfaces of the tungsten crucible.

Refractory articles may be treated by other materials and methods of the present invention not specifically set forth in the examples. For example, titanium nitride coatings may be placed on tantalum or tungsten articles or alloys thereof by a method similar to that employed in Example V wherein a carbide of titanium was prepared. Also, cerium nitride coatings may be successfully deposed on said refractory articles by a similar method. In any event, the coated product is highly satisfactory for retaining high melting materials in open containers at elevated temperatures. The coatings adhere with great tenacity to the refractory ware, do not chip, peel or spall from the article, and resist creeping of any molten material from the container. Furthermore, there is practically no contamination of the melt by the inclusion or solution of coating product with the molten material.

It is thus seen that the methods of the instant invention are very forward steps in the art, eliminating a great many of the difficulties encountered by workers with radioactive heavy metals using prior art methods and equipment. While other embodiments of the invention are possible it is to be understood that the invention is not to be limited except as indicated in the appended claim.

What is claimed is:

The process of preparing refractory ware which comprises applying to at least the inner surface of a heat stable container form of a refractory metal of the class consisting of niobium, molybdenum, tantalum and tungsten, within a period of one-half to ten minutes to prevent substantial alloying, a molten coating of thorium so as to form a non-alloyed coating on the refractory metal and then exposing the thorium coating to a reactive atmosphere of nitrogen at a temperature of about 1750° C. for a time of from about one-half hour to about one hour to form a refractory thorium nitride coating on the heat stable refractory metal form.

References Cited in the file of this patent

UNITED STATES PATENTS

| | | |
|---|---|---|
| 1,551,333 | Schroter et al. | Aug. 25, 1925 |
| 2,032,694 | Gertler | Mar. 3, 1936 |
| 2,205,854 | Kroll | June 25, 1940 |